United States Patent [19]

Winslow et al.

[11] Patent Number: 5,534,472

[45] Date of Patent: Jul. 9, 1996

[54] VANADIUM-CONTAINING CATALYST SYSTEM

[75] Inventors: Linda N. Winslow, Cincinnati; Douglas D. Klendworth, West Chester; Raghu Menon, West Chester; Michael W. Lynch, West Chester, all of Ohio; Garry L. Fields, Seneca; Kenneth W. Johnson, Naperville, both of Ill.

[73] Assignee: Quantum Chemical Corporation, Cincinnati, Ohio

[21] Appl. No.: 412,633

[22] Filed: Mar. 29, 1995

[51] Int. Cl.$^6$ ....................................... B01J 31/14
[52] U.S. Cl. ........................... 502/116; 502/113; 502/119; 526/144
[58] Field of Search ................................... 502/116, 113, 502/115, 119, 120, 129; 526/144

[56] References Cited

U.S. PATENT DOCUMENTS

| | | |
|---|---|---|
| 4,004,071 | 1/1977 | Aishima et al. . |
| 4,378,304 | 3/1983 | Dombro . |
| 4,402,861 | 9/1983 | Hoff . |
| 4,426,317 | 1/1984 | Rogers . |
| 4,434,242 | 2/1984 | Roling et al. . |
| 4,435,518 | 3/1984 | Pennington et al. . |
| 4,435,520 | 3/1984 | Aylward . |
| 4,892,853 | 1/1990 | Cann et al. . |
| 4,918,038 | 4/1990 | Samuels et al. . |
| 5,334,567 | 8/1994 | Menon et al. . |

FOREIGN PATENT DOCUMENTS

| | | |
|---|---|---|
| 89-01496 | 2/1989 | WIPO . |

*Primary Examiner*—Glenn A. Caldarola
*Attorney, Agent, or Firm*—William A. Heidrich

[57] ABSTRACT

A vanadium-containing catalyst system particularly suited to the polymerization of blow moldable olefin polymers. The catalyst system includes a supported, first catalyst component prepared by contacting preheated silica, with (1) a compound or complex which includes at least one carbon to magnesium covalent bond and (2) a compound which includes at least one carbon to Group III metal covalent bond. The sequence of contact of the silica with compound or complex (1) and compound (2) is optional. However, unless the compound or complex (1) and the compound (2) contact the silica simultaneously, the product of this contact is next contacted with whichever of compound (1) or (2) does not initially contact the silica. The product of the step of contacting with compounds (1) and (2) is contacted with a vanadium compound which includes at least one halogen atom. Finally, the product of the vanadium compound contacting step is contacted with an alcohol. A second component of the catalyst system is an organoaluminum compound cocatalyst. The catalyst system also includes a halocarbon compound promoter as a third catalyst component.

47 Claims, No Drawings

VANADIUM-CONTAINING CATALYST SYSTEM

BACKGROUND OF THE DISCLOSURE

1. Field of the Invention

The present invention is directed to a vanadium-containing catalyst system useful in the polymerization of olefins. More particularly, the present invention is directed to a vanadium-containing catalyst system particularly adapted to the formation of olefin polymers used in blow molded articles.

2. Background of the Prior Art

The use of olefin polymers in blow molded articles is well established in the art. Olefin polymers combine relative low cost with chemical inertness. As such, they are particularly suitable for use as containers. Containers formed of olefin polymers, as those skilled in the art are aware, are usually prepared by blow molding techniques. Blow molded polyolefin bottles are often employed as inert containers for liquids whose properties but for the inertness of the polyolefin container would be affected by the material of construction of the container. As a result, foods, soaps, detergents and the like, which cannot be affected by the material of construction of the container, are oftentimes vended in polyolefin containers. Obviously, breakage, a problem associated with glass, is not a detriment of polyolefin containers, which otherwise meets this requirement of chemical inertness, emphasizes its desirability over other materials used in such applications.

Those skilled in the art are particularly aware of the preferred suitability, among other olefin polymers, of ethylene polymers in the formation of articles formed by blow molding techniques. Ethylene polymers, either homopolymers or copolymers wherein the comonomer is a higher α-olefin, such as butene or hexene, in a low concentration, having a preferred density in the range of between about 0.94 and about 0.97, are particularly suitable, because of their low cost, chemical inertness and non-brittleness, for use as milk bottles, detergent bottles and the like.

Those skilled in the art of blow molding plastic articles are aware of the essential combination of processing and property characteristics required to successfully prepare blow molded articles. Indeed, the continuing development of new olefin polymers, especially ethylene polymers, has focused upon the development of resins having both processing and article physical properties required in high volume production of high quality containers and other blow molded articles.

Although the criteria for acceptable plastic containers and bottles are well established in the art, the criteria for acceptability of olefin polymers in terms of its processability varies with the equipment employed. Two classes of blow molding apparatus are utilized in the formation of blow molded polymeric articles. The first of these classes is continuous blow molding apparatus. Suffice it to say, the processing speed of this type of blow molding apparatus is inversely proportional to the viscosity of the molten polymer processed therein. A commonly employed measure of the suitability of a resin for continuous blow molding operations is the property known as $\eta^*_{100}$. $\eta^*_{100}$ measures the viscosity, in poise, of a polymeric resin rotated at 100 reciprocal seconds. The lower the viscosity of a polymer, the easier and more efficient is its processability during blow molding fabrication, on continuous blow molding apparatus, into blow molded articles.

The processability properties of a plastic resin fabricated into blow molded articles are more complex than its product properties. This is because of the common utilization of a second class of blow molding apparatus in the formation of blow molded articles. In addition to continuous blow molding equipment, this second class of blow molding apparatus utilizes intermittent reciprocal screws. This non-continuous apparatus, although dependent upon polymer viscosity, is more critically dependent upon another polymer rheological property, zero land die swell.

Three physical properties which mark a good blow molded article are environmental stress crack resistance (ESCR), top load ESCR and column crush. For a polymer to be successfully employed in blow molded article applications these properties must be sufficiently high to insure requisite bottle leak proofness and strength.

An additional advantage of catalyst systems which produce superior quality resins relates to the increasing practice in this art of blending recycled polymer with virgin polymer. As those skilled in the art are aware, recycled polymer possesses inherently inferior physical properties compared to virgin polymer. This results in a blend of virgin and recycled polymer having inferior properties compared to virgin polymer alone. Therefore, the blending, with a recycled polymer, of a virgin polymer having the enhanced properties produced by an improved catalyst system provides a resin composition which, when molded, produce molded articles having improved properties compared to those blended from recycled polymer and the virgin polymers of the prior art.

To meet these requirements the vast majority of olefin polymers destined for processing on blow molding apparatus are presently synthesized into high density polyethylene (HDPE) using silica supported chromium catalyst systems. Such systems produce HDPE having broad molecular weight distribution.

Chromium-based catalyst systems, commonly employed to prepare ethylene polymers used in the manufacture of blow molded articles, especially bottles and the like, suffer from a major failing complicating the polymer-forming reaction. That is, chromium-based catalysts are very sensitive to polymerization upset caused by even very minor ethylene feedstock contamination. This is especially critical in that even minute concentrations of oxygen or moisture disrupt the process of polymerizing ethylene polymers when catalyzed by chromium-based catalysts, which, as stated above, is the standard prior art catalyst used in the polymerization of blow moldable grades of ethylene polymers.

Traditional Ziegler-Natta catalyst systems, based on the use of the single transition metal titanium, provide excellent control of the molecular weight of product olefin polymer albeit they do not adequately control molecular weight distribution. Thus, although these traditional titanium-containing catalyst systems have been employed in this application, they have been used in costly multiple reactor polymerizations. Such reaction schemes overcome the molecular weight distribution problem but at no small cost.

Multiple reactor polymerizations provide reduced production rates, increased process complexity, significant gelling, which gelling results from the immiscibility of the resin product of a first reactor with the resin product of a second reactor in the liquid state, increased capital expense and increased operating costs.

More recently, dual-site or multi-site Ziegler-Natta catalyst systems, which meet the requirements of both absolute molecular weight as well as molecular weight distribution, have been developed to provide requisite product and processability polymer physical properties.

One such development is set forth in U.S. Pat. No. 4,918,038 to Samuels et al. which describes a catalyst system which comprises a vanadium-containing component. The vanadium-containing component is the reaction product of a vanadium halide and a boron trihalide or an aluminum halide which may include up to two alkyl groups. The four-component catalyst system of the '038 patent includes, as a second component, a zirconium-magnesium halogen-containing complex or a vanadium oxy compound. The third and fourth components of the '038 catalyst system are identical with the second and third catalyst components of the aforementioned '853 patent.

Other developments pertinent to the subject of the instant invention include U.S. Pat. No. 4,004,071 to Aishima et al. which describes a method for homopolymerizing ethylene or copolymerizing ethylene and another olefin wherein the catalyst utilized is the reaction product of a hydrocarbon-soluble complex containing aluminum and magnesium and at least one compound selected from the group consisting of titanium and vanadium compounds which contain at least one halogen atom. These catalyst systems include a trialkyl aluminum or dialkylaluminum hydride cocatalyst.

U.S. Pat. No. 4,378,304 to Dombro describes a catalyst component, which, in conjunction with a cocatalyst and hydrogen, polymerizes ethylene. This catalyst is the sequential reaction product of (1) a porous support of a Group IIA organometallic compound; (2) water or a hydrocarbyl alcohol; and (3) a Group IVB and/or Group VB transition metal compound. The cocatalyst utilized with the catalyst component is a Group IA, IIA, IIIA and/or IIB organometallic compound. It is emphasized that the preferred transition metal compound of the catalyst component is a titanium-containing compound.

U.S. Pat. No. 4,402,861 to Hoff describes an olefin polymerization catalyst which includes a solid catalyst component formed by reacting, in the presence of a solvent, any one of silica, alumina and silica-alumina, preheated to between 200° C. and 900° C., with an alcohol and a magnesium alkyl or a magnesium-aluminum complex. The sequence of reaction of the alcohol and the organomagnesium compound is optional. That is, either the alcohol or the organomagnesium compound can contact the solid inorganic oxide first followed by contact with the second of the two compounds. Finally, the resultant product is contacted with a titanium, vanadium or zirconium halide, oxyhalide or alkoxyhalide.

U.S. Pat. No. 4,426,317 to Rogers describes a catalyst composition useful in the polymerization of olefins wherein an inorganic oxide, predried to remove adsorbed water, is reacted with an organometallic compound of a Group III metal, preferably a trialkylaluminum compound. That product, in turn, is contacted with a vanadium compound wherein the vanadium has a valence of at least +3.

U.S. Pat. Nos. 4,434,242 to Roling et al. and 4,435,518 to Pennington describe similar olefin polymerization catalyst compositions. Both of these catalyst compositions are obtained by drying an inorganic oxide having surface hydroxyl groups to remove adsorbed water. The so-treated oxide is contacted with an organometallic compound having at least one alkyl group attached to a Group III metal. This organometallic compound is preferably a trialkylaluminum. The thus-treated product is contacted with a vanadium halide and finally contacted with, in the case of the '242 patent, an ether-alcohol and, in the case of the '518 patent, an alcohol.

U.S. Pat. No. 4,435,520 to Aylward describes a catalyst composition similar to the aforementioned U.S. Pat. Nos. 4,434,242 and 4,435,518 but for the omission of the final alcohol or ether-alcohol contacting step. However, this patent requires that the vanadium halide be a mixture of vanadyl chloride and vanadium tetrachloride.

U.S. Pat. No. 5,334,567 to Menon et al. teaches an α-olefin polymerization catalyst system. The system includes a solid catalyst component formed by admixing a solid inorganic oxide, a Group III organometallic compound, a vanadium-containing compound and an organic reagent which may be an alcohol, an ether, a carbonate, an amine, a phosphorus compound or a dialcohol. The catalyst system includes a halosilane cocatalyst and may include a modifying compound having the formula $M(R^4)_d X_{3-d}$ where M is aluminum or boron; $X^3$ is halogen; $R^4$ is saturated hydrocarbon having 1 to 12 carbon atoms; and d is 0 or an integer of 1 to 3.

In addition to the above patents, U.S. Pat. No. 4,892,853 to Cann et al., describes a vanadium catalyst system which includes a vanadium-containing catalyst component. That component is the reaction product of a vanadium halide or a vanadium acetylacetonate and an electron donor which is a liquid, organic Lewis base. That base may be an ester, a ketone, an amine, an alcohol, an ether or mixtures thereof. The catalyst composition of the '853 patent includes a hydrocarbyl aluminum cocatalyst and a halocarbon promoter.

Although the above discussion of the prior art barely skims the surface of catalyst systems employed in the synthesis of blow molding resins, it is apparent that the catalyst systems of these and other disclosures, employed to produce an olefinic, especially ethylenic, polymer having the required combination of product and process characteristics necessary for the successful production of blow molded articles, especially bottles and other containers of liquid foods, detergents and the like, can be improved to provide properties better suited to this application.

BRIEF DESCRIPTION OF THE INVENTION

A new catalyst system has now been developed which is used in the polymerization of olefins, especially ethylene polymers, particularly suited for use in blow molding applications. These polymers combine process and product properties uniquely suited for use as bottles, containers and the like. That is, this catalyst system produces polymers characterized by rheological properties which permit rapid formation into blow molded articles such as bottles, containers and the like which themselves have sufficiently high strength and leakproof properties insuring their suitability for use as containers for foodstuffs, soaps, detergents and the like. This new catalyst system, moreover, better tolerates minor concentrations of impurities, such as air, oxygen or moisture, without polymerization reaction upset.

In accordance with the present invention a catalyst system is provided. That system, useful in the polymerization of olefins, comprises a supported catalyst component; an organoaluminum compound; and a halocarbon compound. The supported catalyst component is prepared by the steps of preheating silica at a temperature in the range of between about 200° C. and about 350° C. The preheated silica is contacted with a compound selected from the group consisting of (1) a compound or complex which includes at least one carbon to magnesium covalent bond and (2) a Group III metal compound containing at least one carbon to metal of Group III of the Periodic Table of the Elements covalent bond. The product of this contact is contacted with whichever of compound (1) or (2) is not used to contact the preheated silica. Alternately, the preheated silica may be simultaneously contacted with compounds (1) and (2). The product of this third contacting step is contacted with a vanadium compound which includes at least one halogen atom. Finally, the product of the vanadium contacting step is contacted with an alcohol.

DETAILED DESCRIPTION

The catalyst system of the present invention includes a solid catalyst component supported on silica. The silica support provides optimum results if the silica particles have an average particle size in the range of about 30 to 600 microns. More preferably, the particle size of the silica is about 30 to 100 microns. The silica is further preferably characterized by a surface area of about 50 to 1000 square meters per gram, more preferably, about 100 to about 400 square meters per gram. The silica is also defined, in a preferred embodiment, by a pore volume of about 0.5 to 3.5 cc per gram, more preferably, about 0.5 to about 2 cc per gram.

The silica having the above-preferred characteristics is thereupon preheated to remove water that may be adsorbed on its surface. The preheating step involves heating the silica particles to a temperature in the range of between about 150° C. to about 800° C. Preferably, the silica is preheated to a temperature in the range of between about 200° C. to about 300° C.

The thus preheated silica is thereupon contacted with two contacting agents. The first of the two contacting agents is a compound or complex including at least one carbon to magnesium covalent bond. The second contacting agent is a compound which includes at least one carbon to a metal of Group III of the Periodic Table of Elements covalent bond. Although the above recital speaks of first and second compounds, actual contact of the preheated silica with the two compounds can occur simultaneously or in either order. That is, the preheated silica can first contact either the compound or complex which includes at least one carbon to magnesium covalent bond or the compound which contains at least one carbon to Group III metal covalent bond. The second contacting step, however, is required to be contact between the product of the first contacting step and the compound that was not elected for contact in the first contacting step. Thus, if the first step involves contact with the magnesium-containing compound then the following step is contact with the Group III metal-containing compound and vice versa. Alternatively, the preheated silica can simultaneously be contacted with a compound or complex which includes at least one carbon to magnesium covalent bond and a compound which includes one carbon to Group III metal covalent bond.

It is important to appreciate that although these two contacting steps occur in either order, insofar as either contacting step may occur first, the polymeric products produced by polymerizing olefins with the solid catalyst component produced by this sequence variation results in the formation of polymers having different rheological properties important in the processing of blow molded resins. It should be further appreciated, however, that, independent of this sequence, the blow molded article properties of polymers resulting from this sequence variation are substantially alike. These conclusions will be made clear in an analysis of the examples of the instant specification.

The contacting steps between the silica and the magnesium- or the Group III metal-containing compounds and between the product of the first contacting step and the magnesium-containing or the Group III metal-containing compound, of the second contacting step are preferably conducted in the presence of an inert hydrocarbon, liquid under ambient conditions. Of the aliphatic and aromatic hydrocarbons that may be used as the inert liquid, alkanes are preferred. Any alkane which is liquid under ambient conditions may be utilized. Thus, $C_4$–$C_{10}$ alkanes are preferred. More preferably, a $C_5$–$C_8$ alkane is utilized in this application. Most preferably, the inert hydrocarbon liquid is hexane or heptane.

It is emphasized that not only are the two aforementioned steps preferably conducted in an inert hydrocarbon solvent but the contacting steps discussed below similarly occur in an inert hydrocarbon liquid. In preferred embodiments, the identity of the more preferred hydrocarbon liquids utilized in the first two contacting steps are preferably used in the latter steps as well. Thus, it is preferred that the inert hydrocarbon liquid that serves as the silica slurrying agent, serve also as a solvent for the contacting compounds discussed below.

Turning to a detailed discussion of the first two contacting steps, which occur in random order, one of these steps is contact with a compound or complex which includes at least one carbon to magnesium covalent bond. That compound or complex preferably has the structural formula

$$MgR_2 \cdot nAlR^1_3 \qquad (I)$$

where R is the same or different and is hydrocarbyl; $R^1$ is the same or different and is hydrocarbyl; and n is 0 to about 1.

More preferably, the compound having the structural formula (I) is characterized by R being the same or different and being alkyl, alkenyl, aryl, aralkyl or alkaryl; and $R^1$ being the same or different and being alkyl, alkenyl, aryl, aralkyl or alkaryl.

Still more preferably, the magnesium-containing compound has the structural formula (I) where R is the same or different and is $C_1$–$C_8$ alkyl; $R^1$ is the same or different and is $C_1$–$C_8$ alkyl; and n is 0 to about 0.7.

Even still more preferably, the compound having the structural formula (I) is characterized by R being the same and being n-butyl; $R^1$ being the same being ethyl; and n is 0 to about 0.133. Most preferably, n is 0 or about 0.133.

The compound which includes at least one carbon to Group III metal is preferably a compound where the Group III metal is aluminum. More preferably, this compound has the structural formula

$$AlR^2R^3R^4 \qquad (II)$$

where $R^2$, $R^3$ and $R^4$ are the same or different and are hydrocarbyl.

Still more preferably, $R^2$, $R^3$ and $R^4$ of compound (II) are the same or different and are alkyl.

Even still more preferably, $R^2$, $R^3$ and $R^4$ of compound (II) are the same or different and are $C_1$–$C_6$ alkyl.

Most preferably, the compound having the structural formula (II) is triethylaluminum.

The third contacting step, and the fourth overall step in the formation of the supported catalyst component of the catalyst system of the present invention, involves contact with a vanadium compound which includes at least one halogen atom. Preferably, the vanadium compound is selected from the group consisting of a compound having the structural formula

$$(R^5O)_pVO_mX_{3-p} \qquad (III)$$

where $R^5$ is $C_1$–$C_{12}$ hydrocarbyl; X is halogen; m is 0 or 1 and p is 0, 1 or 2; and a compound having the structural formula $$(R^5O)_q VX_{4-q} \qquad (IV)$$

where q is 0, 1, 2 or 3; and $R^5$ and X have the meanings given above.

More preferably, the compounds having the structural formulae (III)–(V) are characterized by p, q and r being 0; and X being chlorine or bromine. Thus, such compounds as $VOCl_3$, $VOBr_3$, $VCl_4$, $VBr_4$, $VCl_3$ and $VBr_3$ are more preferred for use in the formation of the solid catalyst component of the present invention. Most preferably, the vanadium compound is $VOCl_3$, $VCl_4$ or $VCl_3$.

The final contacting agent in the formation of the solid catalyst component of the catalyst system of this invention is an alcohol. Preferably, the alcohol utilized in the formation of the solid catalyst component has the structural formula $$R^6OH \qquad (V)$$

where $R^6$ is $C_1$–$C_{12}$ hydrocarbyl.

More preferably, the compound having the structural formula (V) is characterized by $R^6$ being $C_1$–$C_{12}$ alkyl.

Still more preferably, structural formula (V) is defined by $R^6$ being $C_1$–$C_8$ alkyl.

Even still more preferably, $R^6$ in structural formula (V) is $C_2$–$C_6$ alkyl.

Most preferably, the alcohol having the structural formula (V) is n-butanol.

As stated above, the contacting steps preferably occur in an inert hydrocarbon solvent. Thus, in a preferred embodiment, a slurry is initially formed of preheated silica by disposing particles thereof in an inert liquid hydrocarbon. The remaining contacting agents are thereupon added thereto. In preferred embodiments, the added contacting compounds are themselves dissolved in an inert hydrocarbon liquid solvent. Even more preferably, the solvent used to slurry the silica is identical to the solvent used to form a solution of the contacting compound introduced therein.

It is preferable that the contacting agents be present in fixed concentrations in order to produce a more effective catalyst component. To that end each contacting agent employed in the formation of the supported catalyst component is preferably present in a concentration range based on a fixed amount of the dried, solvent-free support. Thus, the compound or complex which includes at least one magnesium to carbon covalent bond is preferably present such that its concentration is in the range of between about 0.1 millimole and about 2.0 millimoles of magnesium per gram of silica. More preferably, the magnesium-containing compound or complex contacts silica such that the concentration of the magnesium-containing compound or complex provides about 0.4 millimole to about 1.4 millimoles of magnesium per gram of silica. Still more preferably, the concentration of the magnesium-containing compound or complex provides about 0.6 millimole to about 1.0 millimole of magnesium per gram of silica.

The Group III metal-containing organic compound is preferably provided in a concentration, in the formation of the solid catalyst component, such that between about 0.1 millimole to about 2.0 millimoles of the Group III metal contacts 1 gram of the silica particles which constitute the support. More preferably, the concentration of the Group III metal in the Group III metal-containing compound is in the range of between about 0.4 millimole and about 1.4 millimoles per gram of silica. Still more preferably, the concentration of the Group III metal in the Group III metal-containing compound is in the range of between about 0.6 millimole and about 1.0 millimole per gram of silica.

The vanadium compound whose inclusion characterizes the solid catalyst component is preferably employed in an amount such that the vanadium concentration is between about 0.2 millimole and about 1.4 millimoles per gram of silica. More preferably, the vanadium concentration in the vanadium-containing compound is in the range of between about 0.4 millimole and about 1.2 millimoles per gram of silica. Still more preferably, the concentration of the vanadium-containing compound, as measured by the vanadium concentration is between about 0.6 millimole and about 0.9 millimole of vanadium per gram of silica.

The final contacting agent, an alcohol, is preferably present in the concentration such that there are between about 0.01 millimole and about 2.0 millimoles of the alcoholic contacting agent per gram of silica. More preferably, the alcohol is present in an amount in the range of between about 0.1 millimole and about 1.0 millimole per gram of silica. Still more preferably, the alcohol compound concentration is between about 0.1 millimole and about 0.5 millimole per gram of silica.

It is preferred that the vanadium compound be present relative to the alcoholic compound such that the molar ratio of alcohol to vanadium compound is no more than about 1. More preferably, the molar ratio of the alcoholic compound to the vanadium compound, employed in the formation of the solid catalyst component, is in the range of between about 0.05:1 and about 1:1. Still more preferably, the molar ratio of the alcoholic compound to the vanadium compound is in the range of between about 0.1:1 and about 0.6:1. Even more preferably, this molar ratio is in the range of between about 0.2:1 and about 0.3:1.

The catalyst system of the present invention includes, as a second catalyst component, an organoaluminum compound cocatalyst. Preferably, the organoaluminum compound, useful as a cocatalyst, has the structural formula $$AlR^7_r X^1_{3-r} \qquad (VI)$$

where $R^7$ is the same or different and is hydrocarbyl; $X^1$ is halogen; and r is an integer of 1 to 3.

More preferably, $R^7$ is $C_1$–$C_8$ hydrocarbyl; and $X^1$ is chlorine or bromine in the structural formula (VI).

Still more preferably, the aluminum compound having the structural formula (VI) is characterized by $R^7$ being the same or different and being $C_1$–$C_8$ alkyl; and r being 3.

Even more preferably, the organoaluminum compound having the structural formula (VI) is characterized by $R^7$ being the same and being $C_1$–$C_4$ alkyl.

The third component in the catalyst system of the present invention is a halogen-containing promoter. That promoter is preferably characterized by the structural formula $$M_t H_s X^2_{2t+2-s} \qquad (VII)$$

where M is carbon, silicon, germanium or tin; $X^2$ is the same or different and is halogen; t is an integer of 1 to 5; and s is 0 or an integer of 1 to 11.

More preferably, the halogen-containing compound promoter having the structural formula (VII) is a halocarbon where M is carbon; $X^2$ is the same or different and is fluorine, chlorine or bromine; t is an integer of 1 to 3; and s is 0 or an integer of 1 to 7.

Preferred halocarbon compounds, used as promoters in the catalyst system of the present invention, include carbon tetrachloride, carbon tetrabromide, dichloromethane, dibromomethane, trichloromethane (chloroform), tribromomethane, 1,1,1-trichloroethane, 2,2-difluorotetrachloroethane, 1-dichlorofluoro-3-difluorochloropropane (Freon 113), methyl bromide, 1,1-dichloro-2,2,2-trifluoroethane, dichlorofluoromethane, trichlorofluoromethane and heptachloropropane.

The organoaluminum compound cocatalyst is preferably present such that the molar ratio of aluminum in the organoaluminum compound cocatalyst to vanadium in the solid, first catalyst component is in the range of between about 10:1 and about 100:1. More preferably, this molar ratio is in the range of between about 15:1 and about 80:1. Still more preferably, the ratio of aluminum in the second catalyst component to vanadium in the first catalyst component encompasses a molar ratio of between about 20:1 and about 60:1. Even still more preferably, this molar ratio is in the range of between about 30:1 and about 50:1. Most preferably, the molar ratio of aluminum in the second catalyst component to vanadium in the first catalyst component is about 40:1.

The concentration of the halocarbon promoter, the third catalyst component of the catalyst system of this invention, is preferably present such that the molar ratio of aluminum in the cocatalyst component to the halogen-containing promoter compound is preferably in the range of between about 0.05:1 and about 20.0:1. More preferably, this molar ratio is in the range of between about 0.2:1 and about 5.0:1. Still more preferably, the molar ratio of aluminum in the organoaluminum cocatalyst to the halogen-containing promoter compound is in the range of between about 0.50:1 and about 2.0:1. Most preferably, this molar ratio is about 1:1.

The olefin or olefins, which, in a preferred embodiment, include ethylene, polymerized utilizing the catalyst system of the present invention produce polymers well suited for processing into blow molded articles. Moreover, the thus produced blow molded article is particularly well suited to the application for which it is designed. Specifically, the olefin polymers produced utilizing the catalyst system of the present invention are characterized by better blow molding processing and blow molded article characteristics than are the olefin polymers designed for use as blow molded articles in the prior art. These improvements are manifested by improvements in well established rheological properties of polymeric materials which are discussed below.

One such rheological property is a measure of polymer elasticity response, denoted as ER. ER, which is unitless, provides a guide to the polymer's processability in the molten state. This response which is a complex rheological phenomenon provides those skilled in the art with a guideline in employing the polymer in the fabrication of various plastic shaped articles. For example, an ER in the excess of about 7.0 is undesirable processability-wise in the formation of fabricated articles. An ER below 5.0 is desirable in the formation of plastic films. On the other hand, the formation of blow molded articles, such as bottles, containers and the like, suggests the use of a polymer having an ER of no more than about 7.0.

Determination of ER requires frequency response data in the linear viscoelastic region. That is, ER is derived from the measured dynamic storage modulus, G', and loss modulus, G", as a function of frequency. Generally speaking, G' is a measure of energy stored and recovered per cycle of sinusoidal deformation; G" is a measure of energy dissipated or lost as heat per cycle. In one method, G' versus G" is plotted in logarithmic coordinates resulting in a curve that is dependent upon MWD and/or LCB and is practically independent of temperature and molecular weight. Curves of this sort are generally known as Modified Cole-Cole Plots as described, for example, by E. R. Harrel et al. in *Journal of Applied Polymer Science*, Vol. 29, pp. 995–1010 (1984); C. D. Han et al. in *Polymer Engineering Reviews*, Vol. 2, No. 2, pp. 135–165 (1982); and N. Nakajima et al. "Modified Cole-Cole Plot as a Tool for Rheological Analysis of Polymers" in "Current Topics in Polymer Science", Vol. II, Ottenbrite et al., Eds., Hanser Publishers (1987). The contents of all of which are incorporated herein by reference, including ASTM D 4440 entitled "Standard Practice for Rheological Measurement of Polymer Melts Using Dynamic Mechanical Properties".

Polydispersity at the high molecular weight end is reflected as higher G' values. Procedurally, any rheometer capable of measuring dynamic mechanical properties of polymer melts over a wide range of frequencies can be used, such as Rheometrics Mechanical Spectrometer Model 605 or 705 or Rheometrics Dynamic Analyzer RDA2, all of which utilize discreet frequencies to cover the wide range.

As will be appreciated by those of skill in the art, if the plot of lnG' versus lnG" is even slightly nonlinear, the resulting ER may be unreliable; an indication of this is if the correlation coefficient of the first order lnG' versus lnG" fit is less than 0.999. Mathematically, ER can be computed by fitting lnG' versus lnG" for the nine lowest frequency points to a linear equation and extrapolating it to calculate G' at $G''=5\times10^3$ dynes/cm². ER is then calculated from the equation:

$$ER=(1.781\times10^{-3})G' \text{ at a value of } G''=5\times10^3 \text{ dynes/cm}^2$$

Another rheological property of importance is $\eta^*_{100}$. This property is a measure of viscosity in poise, determined while the molten polymer is subjected to a shear force provided by rotating the polymer at a speed of 100 radians per second in a dynamic oscillatory rheometer. This test is fully defined in ASTM Standard Test Procedures D4092 and D4440.

In addition to the above discussed rheological properties, important in defining a polymer's processability on blow molding apparatus, there are at least three important blow molded plastic article properties which characterize the suitability of the polymer as the material of construction of such an article.

The first of these properties is bottle environmental stress crack resistance (bottle ESCR), measured in days. This property is determined in a test that involves filling at least 30 standard 16 oz. cylindrical blow molded bottles formed of the resin under test with a 10% solution of a standard detergent in distilled or demineralized water. This solution includes a minute amount of a dye indicator. The capped bottles are placed in an oven maintained at a temperature of 63° C. to 66° C. The test is continued until all the bottles fail or 21 days pass, whichever occurs first. Any bottle that does not fail after 21 days in the oven is reported as >21 days. The failure of each bottle during the test, as manifested by leakage of the solution through the wall of the bottle, is reported as the number of days to failure. Using standard statistical methods the 50% failure point is determined. That is, bottle ESCR reports F50, the estimated time required for 50% of the containers to fail.

The second of these properties is top load environment stress crack resistance (top load ESCR) measured in hours. This property is described and defined in The Plastic Bottle Institute Technical Bulletin PBI 11 incorporated herein by reference.

The third important plastic blow molded article property is column crush. This property, reported in pounds, is fully defined in ASTM Standard Test Procedure D-2659 incorporated herein by reference.

The following examples are provided to illustrate the scope of the present invention. Because these examples are given for illustrative purposes only, the present invention should not be limited thereto.

EXAMPLE 1

Preparation of a Vanadium-Containing Solid Catalyst Component

Silica (2.0 g) (Davison Chemical Company Grade 948 silica) was dried for 6 hours at 200° C. in a dry nitrogen fluidized bed. Prior to further processing the silica was weighed in a three-neck flask, equipped with a nitrogen inlet, overhead stirrer shaft/blade and rubber septum. This operation, as were all further steps in the preparation of the solid catalyst, was conducted in a dry nitrogen atmosphere utilizing a Braun Labmaster [trademark] 130 glovebox. The silica in the flask was thereupon moved to a Schlenk line and processing was conducted under Schlenk techniques to ensure the exclusion of moisture and oxygen. A nitrogen line was attached and heptane (20 ml.) added to the flask to form a silica slurry. Thereupon a solution of 0.5M $(C_4H_9)_2Mg.0.133Al(C_2H_5)_3$ in heptane (2.8 ml.) was added to the slurry. This solution was stirred with the silica slurry for 30 minutes at ambient temperature and pressure. Thereupon, 0.5M triethylaluminum in heptane solution (2.9 ml.) was added to the slurry in the flask. Again, the thus formed mixture was stirred for 30 minutes at ambient temperature and pressure. Thereupon, a 0.53M vanadium tetrachloride in heptane solution (3.0 ml.) was added. As before, the thus formed mixture was stirred for 30 minutes at ambient temperature and pressure. Finally, a 0.5M solution of 1-butanol in heptane (0.9 ml.) was introduced into the flask. Again, the added solution was stirred for 30 minutes at ambient temperature and pressure. The solid catalyst component was recovered by heating the slurry under a nitrogen purge to remove the heptane solvent by evaporation.

EXAMPLE 2

Preparation of a Vanadium-Containing Solid Catalyst Component

Example 1 was identically reproduced but for the sequence of addition of the solution of 0.5M $(C_4H_9)_2Mg.0.133Al(C_2H_5)_3$ in heptane and the 0.5M solution of triethylaluminum in heptane. In this example, the introduction of these solutions, compared to that of Example 1, was reversed. That is, the first compound added to the silica slurry was the 0.5M solution of triethylaluminum followed by the addition of the solution containing the magnesium-containing compound. The synthesis and recovery of the solid catalyst component of this example was otherwise identically conducted in accordance with Example 1.

EXAMPLE 3

Copolymerization of Ethylene and n-Hexene Using Catalyst Component of Example 1

Ethylene and n-hexene were continuously copolymerized in a carbon steel 88-gallon reactor maintained at a temperature of 100° C. and a pressure of 620 psig. The continuous operation was conducted in isobutane which filled the reactor. Conditions were such that 100 pounds of a copolymer of ethylene and n-hexene were produced per hour of operation.

The polymerization reactor was operated under conditions which produced an average catalyst residence time of between 1 and 1½ hours. During this operation, ethylene was continuously fed into the isobutane filled reactor such that it was present in a concentration of between 10 and 15 mole %, based on the number of moles of isobutane present in the reactor. n-Hexene was continuously fed into the 88-gallon reactor such that its concentration in the isobutane was between 0.5 and 1.5 mole %. Hydrogen gas was likewise continuously fed into the reactor such that its concentration was in the range of 0.05 and 1.5 mole %, again based on the molar concentration of the isobutane.

The catalyst system included the solid catalyst component of Example 1, present in a concentration such that the aforementioned rate of 100 lbs. of the ethylene-n-hexene copolymer was obtained.

Similarly, a cocatalyst, triethylaluminum, was utilized in a concentration sufficient to produce a copolymer productivity of 100 lbs. per hour. To obtain this rate the cocatalyst was present, during the duration of the run, in a concentration of between 300 and 1,000 ppm, based on the weight of the isobutane solvent.

Finally, a promoter, trichlorofluoromethane (Freon 11), was present in an amount sufficient to assure a copolymer productivity rate of 100 lbs./hr. In fact, the concentration of Freon 11 required to obtain this productivity during the polymerization run ranged between 500 ppm and 1,500 ppm.

The copolymer produced in this polymerization reaction was tested to obtain physical properties pertinent to its use in blow molding applications. These results are summarized in Table 1.

EXAMPLE 4

Copolymerization of Ethylene and n-Hexene Using Catalyst Component of Example 2

Example 3 was identically reproduced but for the replacement of the solid catalyst component of Example 1 with the solid catalyst component of Example 2. In addition, the promoter of Example 3, trichlorofluoromethane, was replaced with dibromomethane (DBM).

The physical properties, pertinent to its use as a blow molding resin, of the poly(ethylene-n-hexene) product of this example are tabulated in Table 1.

TABLE 1

| POLYMER EXAMPLE NO. | CATALYST SYSTEM USED IN FORMATION OF POLYMER | PROCESSABILITY PROPERTIES | | BOTTLE PROPERTIES | | |
|---|---|---|---|---|---|---|
| | | $\eta^*_{100}$, p.[1] | ER[2] | Bottle ESCR, days[3] | Top Load ESCR, hrs[4] | Col. Crush, lb[5] |
| 3 | Solid Catalyst Component of Example 1, TEAL, Freon 11 | 10,700 | 6.85 | >21 | >500 | 52 |
| 4 | Solid Catalyst Component of Example 2, TEAL, DBM | 13,200 | 5.77 | >21 | >500 | 48 |

[1]$\eta^*_{100}$ is viscosity, measured at 100 rad/sec., in poise
[2]ER is a unitless measure of rheological polydispersity.
[3]Bottle ESCR is environmental stress crack resistance of the product bottle, measured in days.
[4]Top Load ESCR is high load environmental stress crack resistance of the product bottle, measured in hours.
[5]Column Crush, measured in pounds.

ANALYSIS OF THE DATA IN TABLE 1

It is noted that the product properties for the ethylene polymer, bottle ESCR, top load ESCR and column crush, were substantially alike for both catalyst systems employing the solid catalyst component of Examples 1 and 2. This data establishes that the product properties of polymers produced using both embodiments of the solid catalyst component of the catalyst system of this invention are outstanding compared to those prepared using the processes and catalysts used in the prior art in the formation of polymers employed in blow molding applications.

The processability properties are similarly outstanding. However, the alternate methods utilized in the catalyst system of the present invention to produce the solid catalyst component thereof produce polymers that are better suited for utilization in either continuous blow molding apparatus or in reciprocating oscillating screw blow molded apparatus.

Continuous apparatus operate more efficiently using lower viscosity resins. $\eta^*_{100}$ is an indicia of this property. $\eta^*_{100}$ is a measure of viscosity in poise. Thus, the lower that number, the more processable is a resin blow molded on continuous blow molding machines. This is demonstrated by the polymer formed using the solid catalyst component of Example 1. That polymer demonstrates superior processability as manifested by its $\eta^*_{100}$ of 10,700 poise. This viscosity is not only substantially lower than the polymer produced utilizing the solid catalyst component of Example 2 but is lower than other competing ethylene polymers designed for use in blow molding apparatus.

ER, the measure of polydispersity, is an important property in that it varies inversely with zero land die swell. Those skilled in the blow molding art are aware that the lower the polydispersity, the higher the zero land die swell and $U_D$, which is a measure of die swell employed on the commonly used Uniloy [trademark] blow molding machines. Those skilled in the art are further aware that the higher the zero land die swell, as well as the higher the $U_D$ and the lower the ER, the better is the processability of the resin on the reciprocating oscillating blow molding apparatus.

EXAMPLE 5

Preparation of Silica Supported Catalyst Component

Silica of the same grade employed in Example 1 and processed in accordance with the method used in that example was disposed in the same three-neck flask used therein and slurried in heptane (10 ml/g. of silica). The silica slurry was thereupon contacted with $(C_2H_5)(C_4H_9)Mg \cdot 0.133 \, Al(C_2H_5)_3$. (10.7 mmol/g. of silica). The components were permitted to react for 30 minutes at which time triethylaluminum (0.7 mmol/g. of silica) was added to the slurry. Again, 30 minutes were permitted to elapse at which time vanadium tetrachloride (0.8 mmol/g. of silica) was introduced into the slurry. Finally, after another 30 minutes, the slurry was contacted with n-butanol (0.2 mmol/g. of silica).

After allowing the reaction to continue for 30 minutes, the heptane solvent was driven off and the silica supported catalyst component product was analyzed. A summary of this analysis is included in Table 2.

COMPARATIVE EXAMPLE 1

Preparation of Silica Supported Catalyst Component Without Contact with an Aluminum-Containing Compound A silica supported catalyst component was prepared in exact accordance with Example 5 except for the omission of the step of contacting the slurry with triethylaluminum.

The catalyst component product of this example was analyzed and the results of that analysis are summarized in Table 2.

COMPARATIVE EXAMPLE 2

Preparation of Silica Supported Catalyst Component Without Contact with an Magnesium-Containing Compound A silica supported catalyst component was prepared in exact accordance with Example 5 except for the omission of the step wherein the slurry is contacted with the magnesium-aluminum complex.

The catalyst component product of this example was analyzed and the results of this analysis are summarized in Table 2.

TABLE 2

| Catalyst Component of Example No. | Mg. mmol/g. Silica | Al mmol/g. Silica | V mmol/g. Silica |
| --- | --- | --- | --- |
| 5 | 0.90 | 0.68 | 0.82 |
| CE1 | 1.9 | <0.5 | 0.63 |
| CE2 | <0.6 | 1.7 | 0.15 |

EXAMPLE 6 AND COMPARATIVE EXAMPLES 3 AND 4

Polymerization of Ethylene Using the Catalyst Component of Example 5 and Comparative Examples 1 and 2

In Example 6 ethylene was polymerized in a 1 liter, stainless steel reactor under a pressure of 450 psig and a temperature of 100° C.

The reactor was initially charged with 1.0 mL of a 1.0M solution of triethylaluminum in heptane. This was followed by the introduction of hydrogen gas (40 mmol) and then isobutane (0.5 liter). Following the addition of the isobutane, ethylene was added to the reactor in an amount sufficient to bring its concentration to 12 mole % of the solution. The introduction of ethylene was followed by the addition of the solid catalyst component (0.04 g) synthesized in Example 5. Finally, dibromomethane was added to the reactor in an amount of 1.0 mL of a 1.0M solution in heptane. The polymerization reaction was conducted over a period of 1 hour.

In Comparative Example 3, Example 6 was identically repeated but for the substitution of the same amount of the solid catalyst component of Comparative Example 1 for that of the solid catalyst component of Example 5. Similarly, in Comparative Example 4, Example 6 was identically repeated but for the substitution of the same amount of the solid catalyst component of Comparative Example 2 for that of the solid catalyst component of Example 5.

The polyethylene products of these polymerizations were weighed and analyzed for high load melt index, elasticity response and vanadium residue concentration. These measurements are summarized in Table 3.

TABLE 3

| Polymerization Example No. | Catalyzed Using Catalyst Component of Example No. | Activity, g.PE/g.Cat hr | HLMI, g/10 min | ER | V, ppm |
| --- | --- | --- | --- | --- | --- |
| 6 | 5 | 1,856 | 65.3 | 5.8 | 16 |
| CE3 | CE1 | 1,398 | 44.9 | 7.9 | 16 |
| CE4 | CE2 | 1,736 | 400 | 4.8 | 10 |

ANALYSIS OF THE DATA IN TABLE 3

The results summarized in Table 3 emphasize the criticality of the inclusion of the magnesium-containing compound and the aluminum-containing compound contacting steps in the polymerization product of the present invention. Whereas the polymerization reactions of Example 6 and Comparative Examples 3 and 4 were identical, the differences noted therein had, of necessity, to be caused by the non-identical nature of the vanadium-containing catalyst component.

It is noted that the catalyst component evidencing the highest catalytic activity was the catalyst component of the present invention. Moreover, the catalyst component of the present invention provided a melt index consistent with a high enough degree of polymerization and elasticity response to be easily processable in blow molding apparatus and to produce acceptably high blow molded article properties.

It should be appreciated that the polymer of Comparative Example 4, using the catalyst component of Comparative Example 2, had too high an HLMI, i.e. too low a degree of polymerization, for use in blow molding applications.

Finally, the elasticity response of the polymerization product of the catalyst component of the present invention, Example 6, produced a polymer well within the desired degree of elasticity response necessary for processing on blow molding apparatus to produce desirable containers, bottles and the like. The polymer of Comparative Example 3, using the catalyst component of Comparative Example 1, which included no aluminum-containing compound contacting step, had an ER in excess of 7, beyond the desirable range.

The above embodiments and examples are given to illustrate the scope and spirit of the present invention. These embodiments and examples will make apparent, to those skilled in the art, other embodiments and examples. These other embodiments and examples are within the contemplation of the present invention. Therefore, the present invention should be limited only by the appended claims.

What is claimed:

1. A vanadium-containing catalyst system comprising:
    (A) a supported catalyst component prepared by the steps of
        (a) preheating silica at a temperature in the range of between about 150° C. and about 800° C.;
        (b) contacting said preheated silica with a contacting agent selected from the group consisting of (1) a compound or complex which includes at least one carbon to magnesium covalent bond, (2) a compound which includes at least one carbon to a metal of Group III of the Periodic Table of the Elements covalent bond and (3) both a compound or complex which includes at least one carbon to magnesium covalent bond and a compound which includes at least one carbon to Group III metal covalent bond;
        (c) contacting said product of step (b) with whichever of contacting agent (1) and (2) that does not contact said preheated silica in step (b), with the proviso that this step is omitted if said contacting agent (3) is employed in step (b);
        (d) contacting said product of step (b) or (c) with a vanadium compound which includes at least one halogen atom; and
        (e) contacting said product of step (d) with an alcohol;
    (B) an organoaluminum compound cocatalyst; and (C) a halogen-containing promoter compound having the structural formula $C_tH_sX^2_{2t+2-s}$ where $X^2$ is the same or different and is fluorine, chlorine or bromine; t is an integer of 1 to 3 and s is 0 or an integer of 1 to 7.

2. A catalyst system in accordance with claim 1 wherein said silica is preheated to a temperature in the range of between about 150° C. and about 400° C.

3. A catalyst system in accordance with claim 2 wherein said silica is preheated to a temperature in the range of between about 200° C. and about 300° C.

4. A catalyst system in accordance with claim 1 wherein said compound (1) has the structural formula $$MgR_2 \cdot nAlR^1_3$$

where R is the same or different and is hydrocarbyl; $R^1$ is the same or different and is hydrocarbyl; and n is 0 to about 1.

5. A catalyst system in accordance with claim 4 where R is the same or different and is $C_1$–$C_8$ alkyl; $R^1$ is the same or different and is $C_1$–$C_8$ alkyl; and n is 0 to about 0.7.

6. A catalyst system in accordance with claim 5 wherein R is the same and is n-butyl; $R^1$ is the same and is ethyl; and n is 0 or about 0.133.

7. A catalyst system in accordance with claim 1 wherein said Group III metal of said compound (2) is aluminum.

8. A catalyst system in accordance with claim 7 wherein said compound (2) has the structural formula $$AlR^2R^3R^4$$

where $R^2$, $R^3$ and $R^4$ are the same or different and are hydrocarbyl.

9. A catalyst system in accordance with claim 8 wherein $R^2$, $R^3$ and $R^4$ are the same or different and are $C_2$–$C_6$ alkyl.

10. A catalyst system in accordance with claim 9 wherein said compound (2) is triethylaluminum.

11. A catalyst system in accordance with claim 1 wherein said vanadium compound which includes at least one halogen atom is selected from the group consisting of $$(R^5O)_pVO_mX_{3-p} \quad (i)$$

where $R^5$ is $C_1$–$C_{12}$ hydrocarbyl; X is halogen; m is 0 or 1 and p is 0, 1 or 2; and $$(R^5O)_qVX_{4-q} \quad (ii)$$

where q is 0, 1, 2 or 3; and $R^5$ and X have the meanings given above.

12. A catalyst system in accordance with claim 11 where p and q are 0; and X is chlorine or bromine.

13. A catalyst system in accordance with claim 1 wherein said alcohol has the structural formula $R^6OH$, where $R^6$ is hydrocarbyl.

14. A catalyst system in accordance with claim 13 wherein $R^6$ is $C_1$–$C_{12}$ alkyl.

15. A catalyst system in accordance with claim 14 wherein $R^6$ is n-butyl.

16. A catalyst system in accordance with claim 1 wherein said component (B) is a compound having the structural formula $$AlR^7_rX^1_{3-r}$$

where $R^7$ is the same or different and is hydrocarbyl; $X^1$ is halogen; and r is an integer of 1 to 3.

17. A catalyst system in accordance with claim 16 wherein $R^7$ is the same or different and is $C_1$–$C_8$ alkyl; and $X^1$ is chlorine or bromine.

18. A catalyst system in accordance with claim 17 wherein $R^7$ is the same or different and is $C_1$–$C_4$ alkyl; and r is 3.

19. A catalyst system in accordance with claim 1 wherein said component (C) is selected from the group consisting of carbon tetrachloride, carbon tetrabromide, dichloromethane, dibromomethane, chloroform, tribromomethane, 1,1,1-trichloroethane, 2,2-difluorotetrachloroethane, 1-dichlorofluoro-3-difluorochloropropane, methyl bromide, 1,1-dichloro-2,2,2-trifluoroethane, dichlorofluoromethane, trichlorofluoromethane and heptachloropropane.

20. A catalyst system in accordance with claim 1 wherein said components (A) and (B) are present in concentrations such that the molar ratio of aluminum in said component (B) to vanadium in said component (A) is in the range of between about 10:1 and about 100:1.

21. A catalyst system in accordance with claim 20 wherein component (B) and component (C) are present such that the molar ratio of aluminum in said component (B) to the number of moles of said halogen-containing promoter compound of said component (C) is in the range of between about 0.05:1 and about 20.0:1.

22. A catalyst system in accordance with claim 21 wherein said molar ratio of aluminum in said component (B) to vanadium in said component (A) is in the range of between about 15:1 and about 80:1; and said molar ratio aluminum in said component (B) to the number of moles of said halogen-containing promoter compound of said component (C) is in the range of between about 0.5:1 and about 3.0:1.

23. A catalyst system in accordance with claim 22 wherein said molar ratio of aluminum in said component (B) to vanadium in said component (A) is in the range of between about 20:1 and about 60:1; and said molar ratio of aluminum in said component (B) to the number of moles of said halogen-containing promoter compound of said component (C) is in the range of between about 0.50:1 and about 2.0:1.

24. A catalyst system in accordance with claim 23 wherein said vanadium compound used in the formation of component (A) is vanadium tetrachloride, said organoaluminum compound of component (B) is triethylaluminum and said halogen-containing promoter compound of component (C) is dibromomethane.

25. A vanadium-containing catalyst system which comprises (A) a catalyst component formed by the steps which comprise:
  (a) preheating silica particles to a temperature in the range of between about 200° C. and about 300° C.;
  (b) disposing said preheated silica particles in an inert hydrocarbon liquid under ambient conditions, whereby a slurry is formed;
  (c) contacting said slurry with a contacting agent selected from the group consisting of (1) a compound or complex which includes at least one carbon to magnesium covalent bond, (2) a compound which includes at least one carbon to metal of Group III of the Periodic Table of the Elements covalent bond and (3) a mixture thereof wherein said compound or complex (1) is introduced into the slurry at a concentration in the range of between about 0.1 millimole and about 2.0 millimoles of magnesium of said compound or complex (1) per gram of silica and/or said compound (2) is introduced into said slurry at a concentration in the range of between about 0.1 millimole and about 2.0 millimoles of Group III metal of said compound (2) per gram of silica;
  (d) contacting the product of step (c) with whichever of compound or complex (1) and compound (2) does